(12) United States Patent
Sainct et al.

(10) Patent No.: US 9,440,739 B2
(45) Date of Patent: Sep. 13, 2016

(54) DEVICE FOR MAINTAINING THE ALTITUDE OF A PAYLOAD HAVING AN ALTITUDE-MAINTENANCE ENERGY SOURCE THAT IS PERMANENT AND EXTRACTED FROM THE SURROUNDING MEDIUM

(75) Inventors: Hervé Roland Sainct, Le Cannet (FR); Hervé Renault, Cannes (FR)

(73) Assignee: Thales, Courbevoie (FR)

( * ) Notice: Subject to any disclaimer, the term of this patent is extended or adjusted under 35 U.S.C. 154(b) by 1393 days.

(21) Appl. No.: 12/809,115

(22) PCT Filed: Dec. 18, 2008

(86) PCT No.: PCT/EP2008/067555
§ 371 (c)(1),
(2), (4) Date: Jun. 30, 2010

(87) PCT Pub. No.: WO2009/077504
PCT Pub. Date: Jun. 25, 2009

(65) Prior Publication Data
US 2010/0327104 A1    Dec. 30, 2010

(30) Foreign Application Priority Data
Dec. 18, 2007  (FR) ...................................... 07 08847

(51) Int. Cl.
*B64C 37/02*    (2006.01)
*B64C 39/02*    (2006.01)
*B64C 31/02*    (2006.01)
*B64C 31/06*    (2006.01)

(52) U.S. Cl.
CPC ............. *B64C 39/022* (2013.01); *B64C 31/02* (2013.01); *B64C 31/06* (2013.01)

(58) Field of Classification Search
CPC .............................. B64C 31/02; B64C 39/022
USPC ....................................................... 244/153 R
See application file for complete search history.

(56) References Cited

U.S. PATENT DOCUMENTS

| 3,229,517 A * | 1/1966 | Smith .......................... 73/170.28 |
| 7,275,719 B2 * | 10/2007 | Olson ......................... 244/155 A |
| 2001/0025900 A1 * | 10/2001 | Kramer .............................. 244/2 |

FOREIGN PATENT DOCUMENTS

| WO | 20070107018 | 9/2007 |
| WO | WO 2007107018 A1 * | 9/2007 |

* cited by examiner

*Primary Examiner* — Brian M O'Hara
(74) *Attorney, Agent, or Firm* — Baker & Hostetler LLP

(57) ABSTRACT

A device for permanently maintaining the altitude of a payload the altitude-maintenance energy source of which is practically permanent and extracted from the medium includes at least two gliding bodies connected together by at least one physical link and being, in use, at different altitudes relative to the ground and for which the instantaneous winds have, practically permanently, different characteristics, and further includes a system for controlling the respective attitudes of these two bodies.

19 Claims, 1 Drawing Sheet

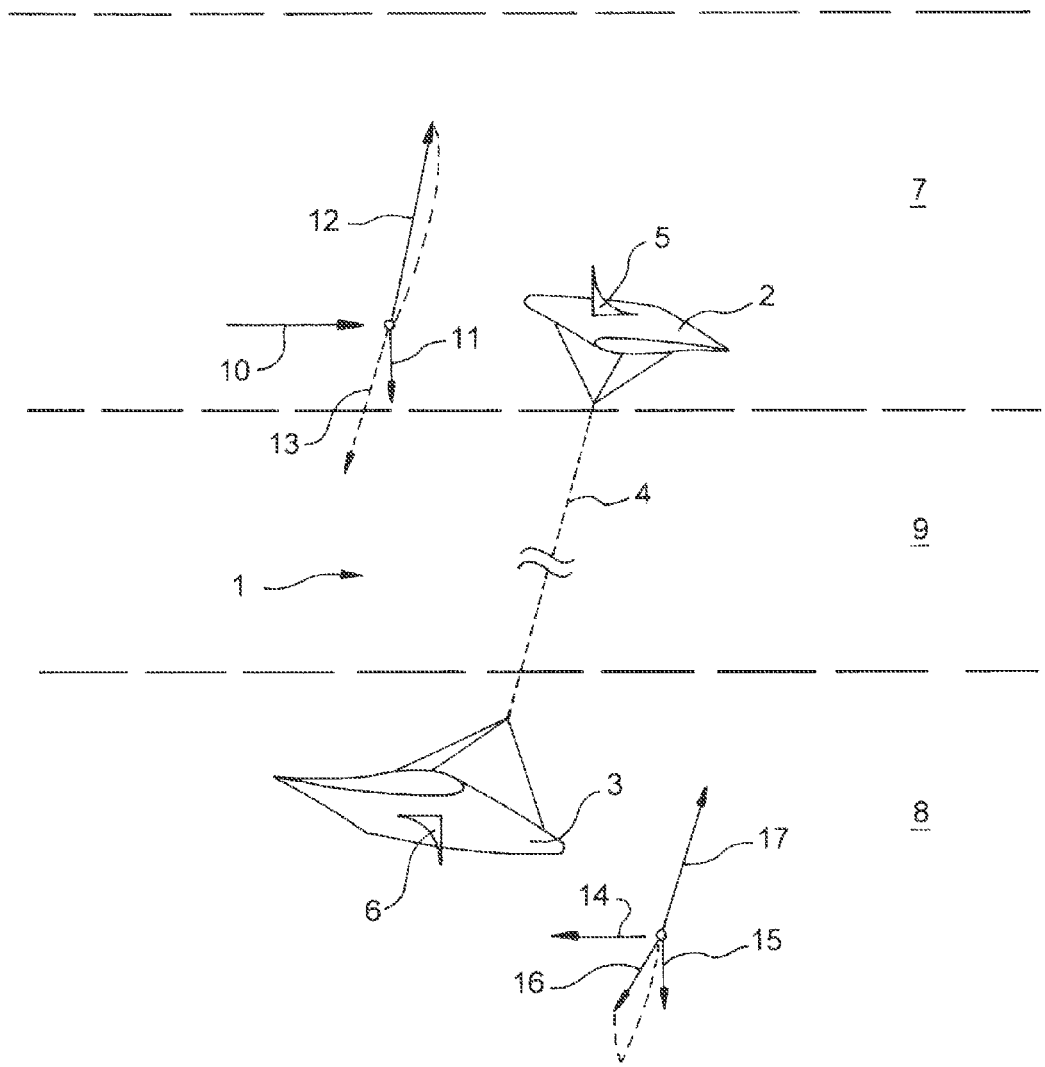

DEVICE FOR MAINTAINING THE ALTITUDE OF A PAYLOAD HAVING AN ALTITUDE-MAINTENANCE ENERGY SOURCE THAT IS PERMANENT AND EXTRACTED FROM THE SURROUNDING MEDIUM

CROSS-REFERENCE TO RELATED APPLICATIONS

This application is a National Stage of International patent application PCT/EP2008/067555, filed on Dec. 15, 2008, which claims priority to foreign French patent application No. FR 07 08847, filed on Dec. 18, 2007, the disclosures of which are incorporated by reference in their entirety.

BACKGROUND OF THE INVENTION (1) Field of the Invention

The present invention relates to a device for maintaining the altitude of a payload the altitude-maintenance energy source of which is permanent and extracted from the medium.

(2) Description of the Related Art

According to America's NASA documents, a "HALE" ("High Altitude, Long Endurance") platform is known that supports observation and telecommunication systems as its payload. This platform essentially comprises a light body in the form of a very elongate rectangle, covered on its upper face with a large number of solar panels powering propulsion propeller engines, which maintain its altitude, but because the propulsion is provided only by solar panels, this platform has a limited service life.

According to document WO 2007/107018 A1, a stand-alone stratospheric platform is known for maintaining the altitude of a payload, but this platform, because it uses parachutes or paragliders as its carrying surfaces, does not have sufficient aerodynamic qualities to remain geostationary for a long period.

SUMMARY OF THE INVENTION

One object of the present invention is a device for permanently maintaining the altitude of a payload the altitude-maintenance energy source of which is practically permanent and extracted from the medium, a device that is not very costly to produce and to launch and which requires minimum servicing while being able to carry a payload that is at least of the same order of magnitude as that of conventional satellites. Moreover, this device of the invention can advantageously replace similar telecommunication or surveillance devices located on the ground, for example a retransmission tower.

The device according to the invention is characterized in that it comprises at least two gliding bodies connected together by at least one physical link and being, in use, at different altitudes relative to the ground and for which the instantaneous winds have, practically permanently, different characteristics, and in that it comprises a system for controlling the respective attitudes of these two bodies.

According to one feature of the invention, the control system is connected to sensors or sources of information relating to the measurement of at least one of the following parameters: wind speed and direction, attitude of the wings, atmospheric pressure, temperature, position of the wings relative to the ground, weather forecasts.

BRIEF DESCRIPTION OF THE DRAWINGS

The present invention will be better understood on reading the detailed description of an embodiment, taken as a nonlimiting example and illustrated by the appended drawing in which:

The single FIGURE is a simplified diagram of a device according to the invention.

DETAILED DESCRIPTION

The invention is described below with reference to a platform carrying a payload consisting of telecommunication equipment, but it is well understood that it is not limited to this sole application, and that the payload may comprise other equipment needing to be supported at altitude, for example optical instruments for terrestrial and/or air observation (cameras, radars, radiotelescopes, etc.), or any other type of radio or optical relay, mono or multidirectional, for applications such as GSM, TV, radio, Wifi, etc. or else applications involving observation instruments (surveillance, monitoring of agricultural changes or of emergency situations, etc.).

The platform 1 of the invention has been schematized in the drawing in the deployed state at altitude. It essentially comprises two gliding portions in this deployed state at different altitudes in wind layers with different characteristics and connected together. One essential characteristic of the invention is that the two portions of the platform are situated at different altitudes, altitudes at which the characteristics of the wind layers are different, as described in greater detail below.

In the example of the drawing, each portion of this platform comprises a gliding body 2, 3 respectively, these two bodies being connected together by a physical link 4, which may be a para-aramid synthetic fiber (e.g., KEVLAR®) cable, which is relatively light, while being strong enough not to break irrespective of the surrounding conditions and the tensions exerted on it by the gliding bodies. This may be for example a cable like those used for stratospheric meteorological balloons. These bodies 2 and 3 are, for example, made in the form of aircraft wings as shown in the drawing, but it is well understood that they may have many other forms, the condition to be observed being that they each have sufficient lift and thinness to keep them constantly suspended taking account of the surrounding conditions. Their production must simply comply with the conventional aerodynamic laws that are well known in aviation. Moreover, these two portions of the platform are not necessarily identical, and it is even preferable that the upper portion has greater lift than that of the other portion in order to be able to support both the weight of the cable 4 and that of the lower portion.

It will be noted that the embodiment of the platform of the invention described here comprises two portions each comprising a gliding body, but it is well understood that each portion of this platform of the invention may comprise a larger number of such bodies. For each of these two portions, the various bodies comprising it are then maintained at adjacent altitudes.

The replacing, at each end of the cable 4, of a large-dimension body with two or more smaller-dimension bodies makes it possible to lighten the total weight at each end of this cable with similar performance, because the larger a gliding body, the stiffer and heavier is the central "beam" (or beams) that stiffen(s) it. Moreover, the link 4, which, in the example of the drawing, is a single cable, may comprise several cables or at least one cable being divided into several strands at at least one of its ends. In the latter case, the wing connected to the strands of the cable can be made lighter because the multiplication of the rigging lines makes it possible to spread the tension forces exerted on the structure of the wing to several points and therefore to lighten this structure by avoiding having an anchorage of the cable at a single point on the wing (which makes it necessary to stiffen its structure with a heavy central beam).

The wings 2 and 3 are both furnished with attitude-control systems allowing each of them to be oriented in all directions as a function of the characteristics of speed and direction of the instantaneous wind layer in which it is suspended, and of the same data for the other wing, for the purpose of controlling the location of one relative to the other and relative to the ground. These control systems comprise mechanical or electromechanical devices acting on the attitude of the wings. These devices are, for example, orientable control surfaces 5, 6 or any other appropriate devices, for example devices for differential tension on a tripod of suspension slings (which makes it possible to modify all the attitude angles of the platform relative to the cable without needing flaps or control surfaces). The attitude-control systems comprise an electronic communication and closed-loop control portion, which can be distributed in one or both wings, and an electromechanical portion incorporated into both wings for controlling the control surfaces. The electronic portion comprises in particular circuits for communication with a ground control center (or with an onboard control center) and between the two portions 2 and 3, and sensors of the magnitudes relating to the environment (wind speed and direction, barometric pressure, temperature, and optionally their changes predicted by weather forecasts, etc.) and the attitude of the wings, and of the circuits using these magnitudes and ensuring the control of the electromechanical portion. How to produce this control system is obvious for those skilled in the art on reading the present description, in the knowledge that in this instance the principles of navigating a sailboat are applied to aircraft elements: tacking close to the wind with the aid of a drift, the bottom wing (for example) taking its place. It will be noted that the wings of the invention have three functions, two of which are unusual: a "conventional" suspension function, two "new" functions: compensation for drift and tension, by virtue of the second atmospheric current, which is completely unusual in aviation, and is not explained in greater detail here.

The device of the invention permanently maintains the altitude of its payload, in particular in zones with unfavorable weather conditions (winds at speeds and/or in directions that do not differ very much, etc.), by virtue of its very thin and very long rigid wings ("aspect ratio") on which strong lateral tensions can be exerted if necessary.

The attitude-control system controls the orientation of the control surfaces as a function of the aforementioned wind characteristics and of the predicted changes in these characteristics and as a function of the instructions that may be sent from the ground for the purpose of moving the platform (for example in order to watch a different portion of the earth's surface if this platform is an observation platform, or in order to make it avoid areas with serious weather disturbances or in order to avoid zones where the characteristics of the wind layers 7 and 8 are not sufficiently different). One possibility is also the complete autonomy of the platform, if it is provided with the weather forecasting capabilities mentioned above and with a system for measuring its position (GPS, Galileo, etc.).

Moreover, the use of weather forecasts makes it possible to anticipate the attitude control of the platform by prepositioning it in advance depending on the locations, speeds, altitudes which will be most favorable when changes in the surrounding conditions are predicted, and in particular changes in wind speed, in order to ensure that the platform is in a virtually geostationary position.

Moreover, the thinness of the wings, which those skilled in the art (for example specialists in the construction of gliders) can determine, is usually very good and optimized to maintain flight in a large number of possible atmospheric conditions (different combinations of winds, altitudes and pressures for example), which, in association with the environmental measurements and the weather forecasts makes it possible to stay in flight permanently. According to one embodiment, these wings are advantageously of lift-to-drag ratio of between 15 and 20 approximately, and the upper wing has a surface area of approximately 100 to 200 $m^2$, the cable connecting the two wings having a length of approximately 3 km.

The platform of the invention is deployed at altitude by any appropriate means, for example with the aid of stratospheric-type balloons, a tow-plane or rockets, that is to say means that are much cheaper than those designed for the launching of conventional satellites, because this platform is deployed at altitudes much lower than those of the orbits of conventional satellites, whether these satellites are in high or low orbit. Specifically, the platform of the invention is deployed, for example, at altitudes of the order of 20 km or less, as specified below.

The platform of the invention takes advantage of the difference in characteristics of the wind layers at altitude, having vertical gradients of speed and/or direction, in particular of the wind layers at altitudes of approximately 10 to 20 km. In the example of the drawing, it involves, in a nonlimiting manner, the wind layer 7 called the "jet stream" in which the wing 2 operates (the base of this layer is at an altitude of approximately 20 km and it is approximately 2 km thick) on the one hand, and the wind layer 8 called the "low-altitude regional winds" situated beneath the first, in which the wing 3 operates. The intermediate zone 9, with unstable properties, separating these two layers 7 and 8 is approximately 1 km thick. The wind speeds in the layers 7 and 8 are very different: of the order of 200 km/h in the layer 7 and of the order of 60 km/h in the layer 8, and their directions are also different, but usually relatively constant in the short term, in particular with respect to the layer 7. An alternative positioning would consist in placing the top wing 2 in the stratosphere above the jet stream and the bottom wing 3 in the jet stream. Another possibility consists in simply exploiting wind gradients independently of the jet stream but, since the latter are irregular, the automation of control is less simple and the permanence over time of the winds other than those of the jet stream and of the stratosphere can be relied upon less.

Naturally, the location of the platform of the invention must be chosen so as to be outside the air traffic corridors. At such an altitude of some twenty kilometers, the earth's surface area "seen" by this platform (a circle with a diameter of approximately 500 to 1000 km) is smaller than that seen by a conventional satellite, but because of its total cost price (manufacture and launch only) which is much less than that of a conventional satellite, it is possible to deploy a larger number of them to observe the same surface area for a cost price that is markedly less than that of a satellite, or else simply to initially serve a smaller zone at a very low price, which also allows a progressive deployment which is much easier from the financial point of view. Consequently, because of the relatively low cost price of the platform of the invention, the latter can also be used to serve as a telecommunications relay or as an observation platform for particular short-duration events (conferences, sporting or other events), and can then be moved to other places for other events.

The practically constant altitude-maintenance energy source of the platform of the invention with its payload lies solely in the different characteristics of the wind layers 7 and 8. These different characteristics are the wind speeds and/or their respective directions.

The attitudes of the portions 2 and 3 are coordinated relative to one another and relative to the wind direction so that they balance their respective tensions on the cable 4 while remaining suspended. Naturally, these two portions are not necessarily stationary relative to the ground, but can "wander", that is to say that they operate (for example by forming figures of 8 in space, or generally a closed curve traveled in a cyclical manner) around a fixed central position (relative to the ground) without moving too far from it. In order to move the platform to another fixed central position, it is sent an appropriate instruction to give preference to the horizontal tension of one or other of the wings 2 and 3 depending on the desired movement.

Schematized in the drawing are the components of the various forces being exerted on the center of gravity of each of the wings. With respect to the wing 2, the horizontal vector 10 represents the force of the relative wind to which it is subjected. The vertical vector 11 represents the force of gravity exerted on the wing 2. The upward (but not necessarily vertical) vector 12 represents the resultant of the vectors of the forces of lift and drag (the vectors marked in dashed lines) exerted on the wing 2 by the relative wind to which it is subjected. The vector 13, practically indistinguishable from the direction of the cable 4, and directed downward, represents the tension force exerted by this cable on the wing 2.

With respect to the wing 3, the horizontal vector 14 represents the force of the relative wind to which it is subjected. The vertical vector 15 represents the force of gravity exerted on the wing 3. The vector (not necessarily vertical) 16 represents the resultant of the vectors of the forces of lift and drag (the vectors marked in dashed lines) exerted on the wing 3 by the relative wind to which it is subjected. It is possible for this wing 3 also to be suspended if the balance of the forces exerted on its center of gravity allows. The vector 17, practically indistinguishable from the direction of the cable 4, and directed upward, represents the tension force exerted by the cable on the wing 3.

The result of the composition of these various vectors is that, for the platform of the invention to remain suspended and to travel not very far from a central fixed point, it is necessary and sufficient that the forces exerted on the cable 4 by the two wings 2, 3 are constantly in equilibrium with one another, that is to say that these wings are oriented correctly relative to the direction of the winds to which they are subjected, as a function of the speed of these winds.

Advantageously, the electric power supply for the onboard electric and electronic equipment (circuits for telecommunication and for control of the control surfaces, electro-optical apparatus of the payload, etc.) is provided for example by solar electric panels associated with batteries or alternatively by one or more small power-generating propellers placed on the wings. Because these solar panels receive the sun's rays almost 50% of the time, and the onboard equipment merely requires much less energy than that required to maintain the altitude of the platforms of the prior art other than geostationary satellites (platforms of the "HALE" type), the batteries in question can be light and cheap.

In conclusion, the platform of the invention is simple and cheap to produce and to deploy at altitude, while being able to be virtually geostationary practically eternally (its service life depending on the lifetime of its components), without the provision of any energy (fuel or other consumable) or a "conventional" engine to keep it at altitude and without requiring a heavy and costly launch vehicle like those required for conventional satellites. The components of the onboard equipment do not need to be "space" certified because the platform operates at low altitude and they can be conventional, low-cost price components (called "COTS"). Moreover, if this platform contains earth-observation telescopes, the latter can be much more compact than those of a conventional satellite fulfilling the same functions, because of the much lower altitude at which the platform of the invention is maintained.

It should be noted that, in the device of the invention, all the members of measurement, control and payload are incorporated inside the wings, which greatly minimizes drag, and these rigid (or in any case much less flexible than parachute cloth) wings thus allow a maximum thinness, hence better aerodynamic efficiency. Moreover, because this device does not need means of electric power to be maintained permanently at altitude, it requires only little energy to power its electric and electronic elements, and said solar panels are more than enough to provide this power.

The invention claimed is:

1. A device for maintaining an altitude of a payload, an altitude-maintenance energy source of which is permanent and extracted therefrom, comprising:
   at least two gliding bodies connected together by at least one physical link and being, in use, at different altitudes relative to ground and for which respective instantaneous winds have different characteristics,
   wherein each of the at least two gliding bodies are shaped as an aircraft wing, each of the at least two gliding bodies comprising a control system to control an attitude of a respective one of the at least two gliding bodies, each control system being incorporated inside a respective one of the at least two gliding bodies.

2. The device as claimed in claim 1, wherein the different characteristics of the instantaneous winds comprise at least one of their speed and their direction.

3. The device as claimed in claim 1, wherein said altitudes are between approximately 10 and 20 km.

4. The device as claimed in claim 1, wherein, in use, one of the bodies is situated in a first wind layer and the other is situated in a second wind layer situated beneath the first.

5. The device as claimed in claim 1, wherein, in use, one of the bodies is situated in a first wind layer of the stratosphere and the other is situated in a wind layer of the jet stream situated beneath the first wind layer.

6. The device as claimed in claim 1, wherein the physical link is a cable connected at a point on each of the two bodies.

7. The device as claimed in claim 1, wherein the physical link is a cable of which at least one end is subdivided into several strands each connected at a different point on the structure of the corresponding body.

8. The device as claimed in claim 1, wherein the wings comprise an electric power supply device powering only the onboard electric and electronic equipment.

9. The device as claimed in claim 1, wherein the payload comprises telecommunication equipment.

10. The device as claimed in claim 1, wherein the payload comprises at least one of terrestrial observation, air observation and telecommunication equipment, this equipment being optical, radio or radar.

11. The device as claimed in claim 1, wherein the payload comprises equipment for the assistance of radio navigation.

12. The device as claimed in claim 4, wherein the first wind layer comprises the jet stream and the second wind layer comprises low-altitude regional winds situated beneath the first wind layer.

13. A system comprising the device as claimed in claim 1, wherein the system controls the respective attitudes of said at least two gliding bodies.

14. A device as claimed in claim 1, wherein the payload is incorporated inside each of the at least two gliding bodies.

15. A device as claimed in claim 1, wherein each wing further comprises an orientable control surface controlling the attitude of the wing.

16. A device as claimed in claim 8, wherein the electric power supply device comprises solar electric panels associated with batteries.

17. A device as claimed in claim 8, wherein the electric power supply device comprises power-generating propellers.

18. A device for maintaining an altitude of a payload, an altitude-maintenance energy source of which is permanent and extracted therefrom, comprising:

at least two gliding bodies connected together by at least one physical link and being, in use, at different altitudes relative to ground and for which respective instantaneous winds have different characteristics, wherein each of the at least two gliding bodies are configured and shaped as an aircraft wing, each of the at least two gliding bodies comprising a control system to control an attitude of a respective one of the at least two gliding bodies, each control system being incorporated inside a respective one of the at least two gliding bodies.

19. A device for maintaining an altitude of a payload, an altitude-maintenance energy source of which is permanent and extracted therefrom, comprising:

at least two gliding bodies connected together by at least one physical link and being, in use, at different altitudes relative to ground and for which respective instantaneous winds have different characteristics;

the at least two gliding bodies are shaped as an aircraft wing; and each of the at least two gliding bodies comprising a control system to control an attitude of a respective one of the at least two gliding bodies, wherein each control system being incorporated inside a respective one of the at least two gliding bodies.

* * * * *

UNITED STATES PATENT AND TRADEMARK OFFICE
CERTIFICATE OF CORRECTION

PATENT NO.      : 9,440,739 B2
APPLICATION NO. : 12/809115
DATED           : September 13, 2016
INVENTOR(S)     : Hervé Roland Sainct et al.

Page 1 of 1

It is certified that error appears in the above-identified patent and that said Letters Patent is hereby corrected as shown below:

On the title page item (22), in the PCT Information:

The filing date of the PCT number is listed as "(22) PCT Filed: Dec. 18, 2008" and should be
--(22) PCT Filed: Dec. 15, 2008--.

Signed and Sealed this
First Day of November, 2016

Michelle K. Lee
*Director of the United States Patent and Trademark Office*